May 24, 1955

R. N. KIRCHER 2,708,923

MEANS FOR LUBRICATING AND COOLING THE CRANK
SHAFTS OF TWO-CYCLE COMBUSTION ENGINES
Filed Oct. 2, 1950

INVENTOR.
RALPH N. KIRCHER
BY
John W. Michael
ATTORNEY

United States Patent Office 2,708,923
Patented May 24, 1955

2,708,923

MEANS FOR LUBRICATING AND COOLING THE CRANK SHAFTS OF TWO-CYCLE COMBUSTION ENGINES

Ralph N. Kircher, West Bend, Wis., assignor to West Bend Aluminum Co., West Bend, Wis., a corporation of Wisconsin Application October 2, 1950, Serial No. 187,961

5 Claims. (Cl. 123—196)

This invention relates to improvements in means for lubricating and cooling the main bearing for crank shafts of combustion engines. The invention has a particular application to the upper main crank shaft bearing of internal combustion engines of the two-cycle type when used with the crank shaft in a substantially vertical position.

Such engines are largely used with outboard motors. Heretofore complicated and expensive means have been utilized to lubricate the upper crank shaft bearings of such engines. For example separate reservoirs or sumps in the crank cases for oil in liquid state have been provided and the oil fed under pressure from such reservoirs or sumps through connections to the main bearing. Such systems, however, require relatively expensive valves operated in timed synchronism with the engine to keep the oil flowing in the proper direction.

It is an object of this invention, therefore, to provide a simple and inexpensive means of adequately lubricating and cooling the main bearing for crank shafts of two-cycle combustion engines.

This object is obtained by providing a relatively large volume plenum chamber at the outer end of the main bearing and connecting such chamber directly with the crank case of the engine. As the pressure within the crank case increases the oil mist or vapor normally present therein will be forced into the plenum chamber. There part of such mist or vapor will condense and oil in a liquid state will be accumulated in large enough quantities to form and continually supply a lubricating film between the crank shaft and the bushing. In addition to thus lubricating the bearing, condensation and movement of the oil mist or vapor in the chamber will aid in keeping down the operating temperature of the bearing. Hence, by this simple expedient the bearing is both lubricated and cooled.

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing in which:

Figure 1:
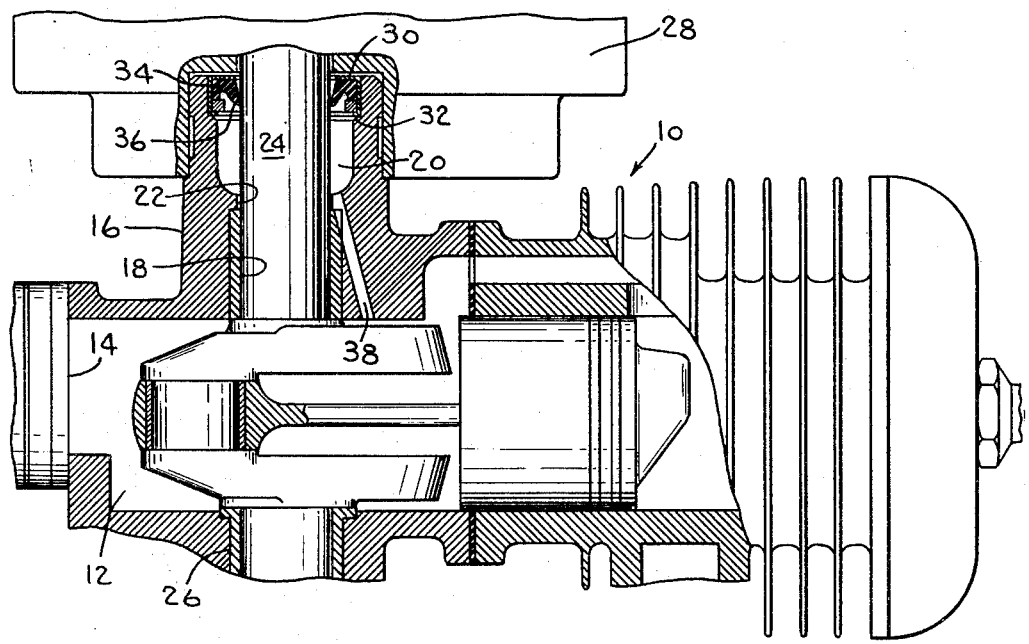
Fig. 1 is a view partly in side elevation and partly in section of an air-cooled two-cycle internal combustion engine embodying the present invention.

While the invention is shown applied to the upper bearing of an air-cooled single cylinder two-cycle engine designed primarily for operation with the crank shaft in a substantially vertical position, its use need not be so limited as it may be applied to any main bearing for the crank shaft of an internal combustion two-cycle engine.

As shown in the drawing, the single cylinder air-cooled two-cycle engine, indicated generally at 10, has a crank case 12 into which a mixture of fuel, lubricating oil, and air is intermittently introduced through the intake port 14. The oil in such mixture is in the form of a mist or vapor which is compressed within the crank case 12 as the pressure is intermittently increased during the normal operation of the engine. A support 16 for the upper bearing has a lower bore in which is mounted a plain bushing 18. Above the bushing 18 the support 16 has an upper bore which forms a relatively large annularly shaped plenum chamber 20. An annular internal shoulder 22 separates the plenum chamber 20 from the bushing 18. It has an internal diameter slightly larger than the crank shaft in order to provide sufficient clearance for oil or lubricant in a fluid state to flow downwardly from the plenum chamber 20 to the bushing 18. A vertical crank shaft 24 is carried in a lower bearing 26 and passes through the upper bearing. To the upper end of the crank shaft 24 there is fixed a flywheel and magneto indicated diagrammatically at 28. The crank shaft 24 has the customary crank within the crank case secured to a piston in a well-known manner.

The upper end of the plenum chamber is closed by an oil seal. This consists of an annular metal shell 30 press-seated on a shoulder 32 formed in the upper end of the chamber 20. Within the shell 30 there is secured a synthetic rubber gasket 34 which has a downturned annular flap 36 in rubbing contact with the surface of shaft 24. With the seal so constructed pressure developed in the plenum chamber 20 in excess of atmospheric pressure tends to increase the tightness of the fit of the seal and prevent the escape of lubricant upwardly therethrough. It is desirable to make the plenum chamber 20 sufficiently large in volume so that enough oil in the form of mist or vapor may be forced therein so that as partly condensed into liquid state there will be enough to continually supply a lubricating film between the bushing 18 and the shaft 24.

In order to supply oil in a mist or vapor to the plenum chamber 20 a passageway 38 extends from the bottom of the plenum chamber to the interior of the crank case 12. Through this passageway the oil in the form of mist or vapor is driven into the plenum chamber as pressure within the crank case 12 is intermittently increased. Some of the oil in such mist or vapor state will contact the walls of the plenum chamber and the surface of the crank shaft and condense into liquid state. This will permit additional oil in the mist or vapor state to be forced into the plenum chamber on subsequent increases of pressure within the crank case 12. Thus the chamber will be constantly supplied with oil in the liquid state. Oil in liquid state within the chamber will by capillary action and by the force of gravity form in a film on the lower surface of such chamber and on the crank shaft 24 and pass down between such shaft and bushing 18. As the oil film gradually works down and escapes out of the lower end of the bushing 18, such film will be continually replaced at the upper end of such bushing from the continually renewed supply in the plenum chamber. Thus the upper bearing is adequately and properly lubricated. In addition to such lubrication, the condensation and the rapid motion of vapor which takes place in the plenum chamber also aids in lowering the operating temperature of the crank shaft 24 immediately above the bushing 18. This has the effect of cooling the upper bearing.

Figure 2:
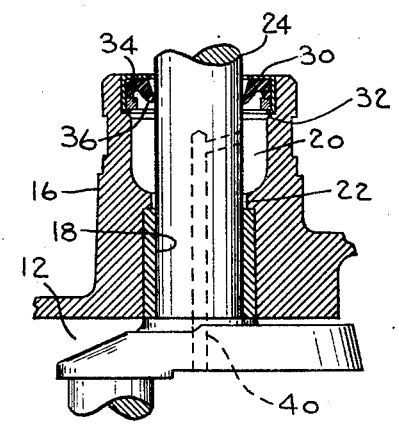
Fig. 2 is a fragmentary sectional view showing a modification of the invention viewed in Fig. 1.

The only difference between the modification of the invention shown in Fig. 2 and that shown in Fig. 1 is in the placement of the passageway between the plenum chamber 20 and the crank case 12. In the modification of Fig. 2 the passageway 40 extends axially of the crank shaft 24 from the inside face of the crank to a place within the confines of the plenum chamber 22. At this place a radially extending branch of the passageway 40 communicates with the surface of the crank shaft within the plenum chamber. There is some advantage in this construction. The action of centrifugal force is utilized to assist in charging the plenum chamber with oil mist or vapor from the crank case.

Figure 3:
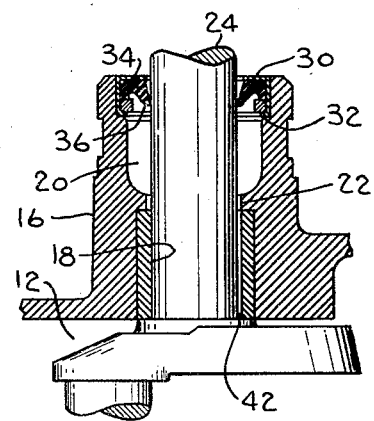
Fig. 3 is a fragmentary sectional view of a further modification of the invention viewed in Fig. 1.

In Fig. 3 there is illustrated a third modification. In this modification the passageway 42 between the plenum chamber 20 and the crank case 12 is made by a slot in the surface of the bushing 18 extending from end to end thereof. It is preferable to place such slot on the cylinder side of the bushing so as not to lessen the bearing surface on the opposite pressure side thereof. The passage of oil mist and vapor through the passageway 42 is accomplished in substantially the same way as in the case of the modification of Fig. 1. Some advantage is derived because the film of oil in liquid state within the passageway 42 is applied to the surface of the shaft 20 throughout the length of the bushing 18. While in the drawings the upper face of the thrust shoulder on crank shaft 24 appears to be flush with the lower face of bushing 18 and hence to close the bottom of passageway 42, such is not the case in actual practice. As is well known to those skilled in this art there is always considerable clearance at this place because the weight of the crank shaft causes it to ride on the lower bearing 36 and thus leave space between the upper bearing and the upper thrust shoulder.

Although only several embodiments of the invention are shown and described herein, it will be understood that this application is intended to cover such other changes or modifications as come within the spirit of the invention or scope of the following claims.

I claim:

1. In an internal combustion engine having a crank case into which lubricant in the form of a mist or vapor is introduced with an explosive mixture, a vertical crank shaft, an upper main bearing for said shaft, a relatively large volume plenum chamber above said main bearing entirely closed except for a continuously open passageway leading directly therefrom to said crank case, said shaft and one end of said bearing being in direct communication with said chamber, and a passageway interconnecting said chamber and said crank case whereby lubricant in the form of mist or vapor may be supplied to said plenum chamber.

2. In a system for lubricating and cooling a vertically positioned main bearing of a two-cycle internal combustion engine, a chamber above said main bearing large enough in volume to receive lubricant in a mist or vapor state and entirely closed except for a continuously open passageway leading directly therefrom to said crank case, a connection between said chamber and said main bearing positioned to permit lubricant in a liquid state to flow from said chamber to said main bearing, and a continuously open passageway between said chamber and said crank case whereby lubricant in the form of mist or vapor in said crank case may be introduced into said chamber during and as the result of operation of said engine.

3. In an internal combustion engine a crank case, a crank shaft having a part operable in said crank case, a main bearing for said crank shaft, a chamber entirely surrounding said crank shaft and enclosed except for the passages hereinafter set forth, said chamber having a liquid lubricant collecting bottom above and leading to said bearing, said chamber having sufficient volumetric capacity to receive enough lubricant in a mist or vapor state so that upon condensation thereof into liquid state there will be enough lubricant in liquid state to supply a lubricating film to said bearing, a first passageway leading from said bottom and directly communicating with said bearing whereby lubricant in liquid state is supplied with the assistance of gravity to said bearing, and a continuously open second passageway leading directly from said crank case above the normal level of any pool of liquid oil in said crank case to said chamber, said second passageway being large enough to permit lubricant in a mist or vapor state to be introduced into said chamber during and as a result of operation of said engine.

4. In an internal combustion engine a crank case, a crank shaft having a part operable in said crank case, a main bearing for said crank shaft, a chamber entirely enclosed except for the passages hereinafter set forth associated with said bearing and having a liquid lubricant collecting bottom above said bearing, said chamber having sufficient volumetric capacity to receive enough lubricant in a mist or vapor state so that upon condensation thereof into liquid state there will be enough lubricant in liquid state to supply a lubricating film to said bearing, a first passageway leading from said bottom and directly communicating with said bearing whereby lubricant in liquid state is supplied with the assistance of gravity to said bearing, and a continuously open second passageway in said crank shaft leading directly from said crank case above the normal level of any pool of liquid oil in said crank case and opening radially of said crank shaft into said chamber. said second passageway being large enough to permit lubricant in a mist or vapor state to be introduced into said chamber during and as a result of operation of said engine.

5. In an internal combustion engine a crank case, a crank shaft having a part operable in said crank case, a main bearing for said crank shaft, a chamber entirely enclosed except for the passages hereinafter set forth associated with said bearing and having a liquid lubricant collecting bottom above said bearing, said chamber having sufficient volumetric capacity to receive enough lubricant in a mist or vapor state so that upon condensation thereof into liquid state there will be enough lubricant in liquid state to supply a lubricating film to said bearing, a first passageway leading from said bottom and directly communicating with said bearing whereby lubricant in liquid state is supplied with the assistance of gravity to said bearing, and a continuously open second passageway consisting of a slot in said main bearing closed along one side by the surface of said crankshaft and leading directly from said crank case above the normal level of any pool of liquid oil in said crank case to said chamber, said second passageway being large enough to permit lubricant in a mist or vapor state to be introduced into said chamber during and as a result of operation of said engine.

References Cited in the file of this patent

UNITED STATES PATENTS

| 1,437,927 | Brockway | Dec. 5, 1922 |
| 1,606,424 | Irgens | Nov. 9, 1926 |
| 1,631,537 | Krenzke | June 7, 1927 |
| 1,907,805 | Heintz | May 9, 1933 |
| 2,185,506 | Johnson | Jan. 2, 1940 |
| 2,273,202 | Jackson | Feb. 17, 1942 |

FOREIGN PATENTS

| 51,488 | Sweden | Apr. 19, 1922 |
| 548,176 | Great Britain | Sept. 29, 1942 |
| 251,920 | Great Britain | May 13, 1926 |